US012688059B2

(12) United States Patent
Sethi et al.

(10) Patent No.: US 12,688,059 B2
(45) Date of Patent: Jul. 21, 2026

(54) SYSTEM AND METHOD FOR MANAGING SERVICE REQUESTS OF A RESTORING DEVICE USING A DIGITAL TWIN

(71) Applicant: Dell Products L.P., Round Rock, TX (US)

(72) Inventors: Parminder Singh Sethi, Ludhiana (IN); Atishay Jain, Meerut (IN); Nithish Kn, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 565 days.

(21) Appl. No.: 18/175,665

(22) Filed: Feb. 28, 2023

(65) Prior Publication Data

US 2024/0289161 A1      Aug. 29, 2024

(51) Int. Cl.
*G06F 9/46* (2006.01)
*G06F 9/54* (2006.01)

(52) U.S. Cl.
CPC ............. *G06F 9/461* (2013.01); *G06F 9/546* (2013.01)

(58) Field of Classification Search
None
See application file for complete search history.

(56) References Cited

U.S. PATENT DOCUMENTS

| | | | | | |
|---|---|---|---|---|---|
| 8,055,614 | B1 * | 11/2011 | Vaikar | ................. | G06F 11/1469 707/657 |
| 2011/0295809 | A1 * | 12/2011 | Tatebe | ................. | G06F 11/1456 711/E12.001 |
| 2013/0205063 | A1 * | 8/2013 | Zhang | ................. | G06F 11/1451 711/E12.008 |
| 2014/0149696 | A1 * | 5/2014 | Frenkel | ............... | G06F 11/1451 711/162 |
| 2016/0055064 | A1 * | 2/2016 | Gostev | ............... | G06F 11/1448 726/4 |
| 2017/0060975 | A1 * | 3/2017 | Akyureklier | ........ | G06F 11/2028 |
| 2017/0063615 | A1 * | 3/2017 | Yang | ....................... | H04L 67/62 |
| 2017/0371567 | A1 * | 12/2017 | Piduri | ..................... | G06F 3/065 |
| 2018/0150365 | A1 * | 5/2018 | Cors | ................... | G06F 11/2025 |
| 2018/0347560 | A1 * | 12/2018 | Stockner | ................ | F04B 15/06 |
| 2019/0332366 | A1 * | 10/2019 | Natanzon | ............ | G06F 11/3696 |
| 2020/0387433 | A1 * | 12/2020 | Wang | ................. | G06F 16/2365 |
| 2020/0412623 | A1 * | 12/2020 | Brown | ............... | H04L 41/5029 |
| 2021/0072965 | A1 * | 3/2021 | Masters | ............. | H04L 41/0895 |
| 2021/0157690 | A1 * | 5/2021 | Wexler | ............... | G06F 11/1417 |

(Continued)

FOREIGN PATENT DOCUMENTS

| | | | | | |
|---|---|---|---|---|---|
| WO | WO-2016201340 | A1 * | 12/2016 | ............. | G06F 8/656 |
| WO | WO-2017127225 | A1 * | 7/2017 | ............. | H04L 67/10 |

*Primary Examiner* — Charles E Anya
(74) *Attorney, Agent, or Firm* — Chamberlain, Hrdlicka, White, Williams & Aughtry; Aly Z. Dossa

(57) ABSTRACT

A method for managing restoration includes receiving, by a restoration orchestrator, a restoration request for the restoration by a restoring device, in response to the restoration request: identifying a downtime preparation time for the restoration, collecting, during the downtime preparation time, service requests from the restoring device, forwarding the service requests to a digital twin device, after the forwarding, making a determination that the downtime preparation time is complete, and based on the determination, initiating a re-servicing of the restoring device, wherein the restoration is complete after the determination.

20 Claims, 6 Drawing Sheets

(56) References Cited

U.S. PATENT DOCUMENTS

| | | | | |
|---|---|---|---|---|
| 2021/0357246 A1* | 11/2021 | Kumar | .................... | G06F 3/067 |
| 2021/0406142 A1* | 12/2021 | Dehganpour | ....... | G06F 11/3024 |
| 2022/0147409 A1* | 5/2022 | Linck | .................. | G06F 11/0787 |
| 2023/0115438 A1* | 4/2023 | DeGraaf | ................. | G06F 9/547 |
| | | | | 707/652 |
| 2024/0126582 A1* | 4/2024 | Jigalur | ................ | G06F 9/45558 |
| 2024/0193327 A1* | 6/2024 | Albero | .................... | G06F 30/27 |

* cited by examiner

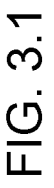
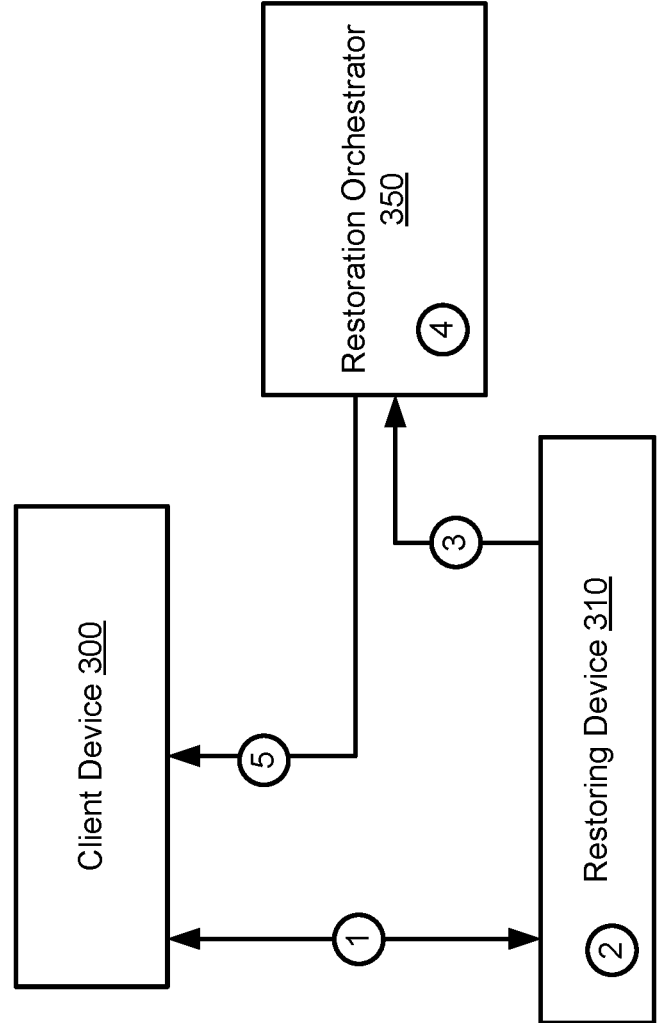
FIG. 3.1

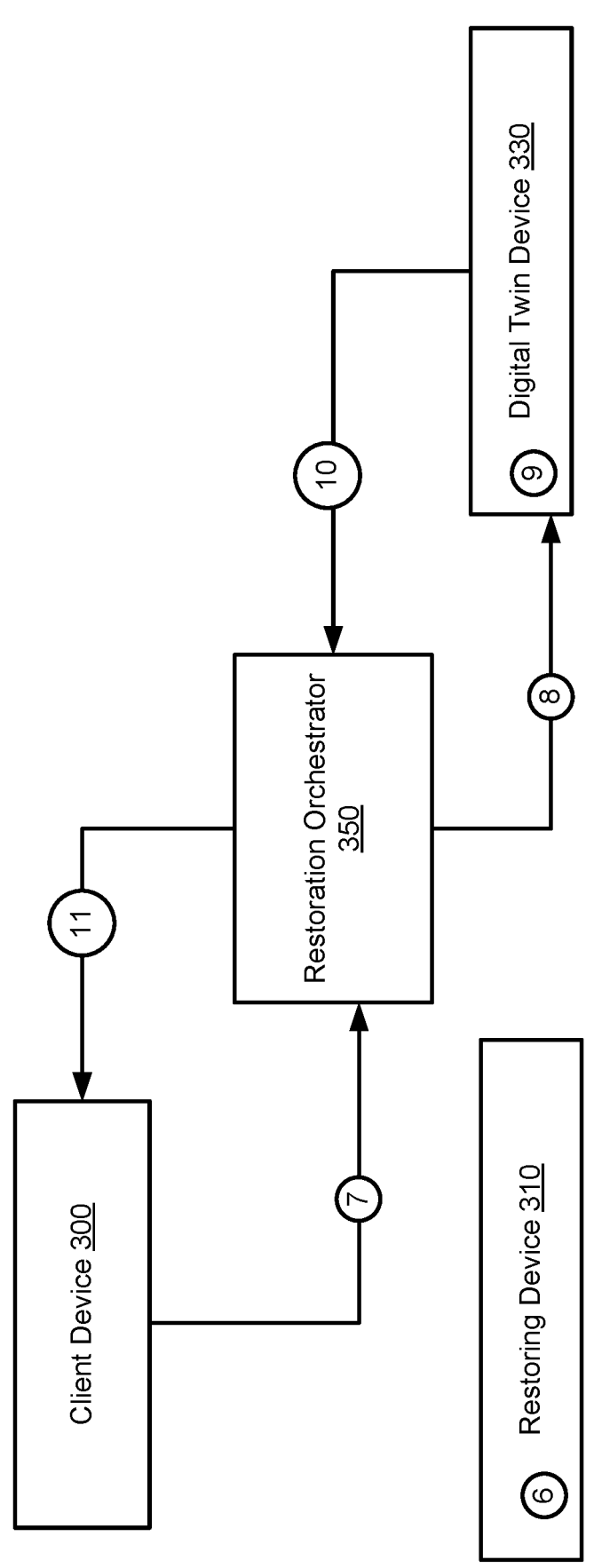
FIG. 3.2

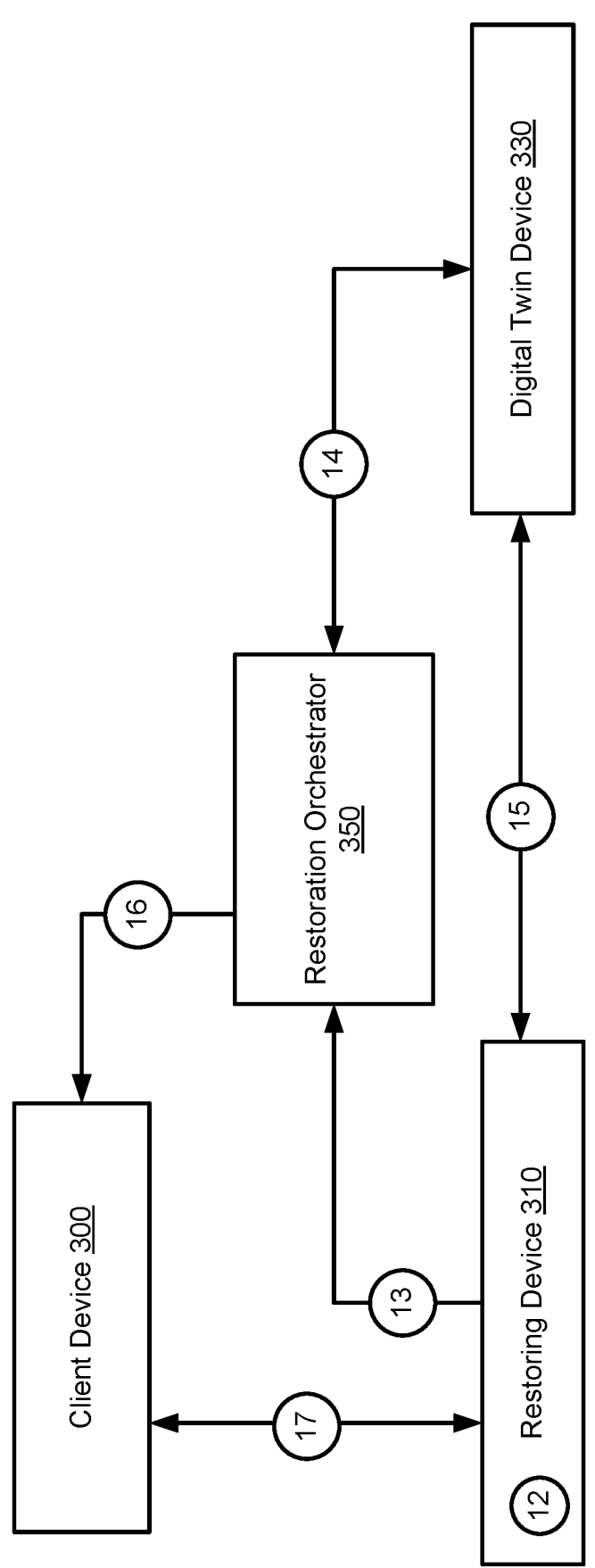
FIG. 3.3

400

SYSTEM AND METHOD FOR MANAGING SERVICE REQUESTS OF A RESTORING DEVICE USING A DIGITAL TWIN

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1-3.3 show example use cases in accordance with one or more embodiments of the invention.

DETAILED DESCRIPTION

Figure 1:
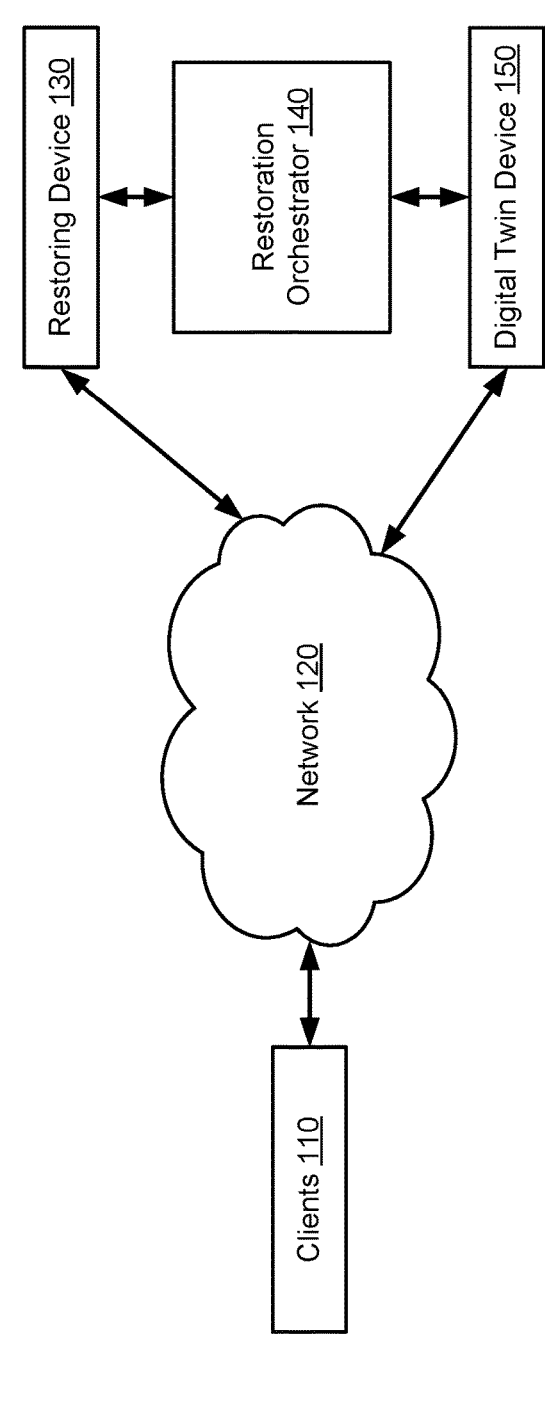
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments of the invention relate to a method and system for managing the backup and recovery of data. In a production environment that includes at least one server and multiple clients using the services of the at least one server, for deployed server devices that are created to serve and process requests from other nodes or clients, typically a checkpoint rollback recovery (CRR) model is implemented to handle failure and backup scenarios. In this production environment, for a server serving numerous clients, a small downtime can cause substantial loss. When a server is restoring, it may be beneficial to offer mechanisms for continuing to service request intended despite the restoring device not being able to service such requests during the restoration.

Embodiments of the invention include a restoring device, a restoration orchestrator, which may be internal or external to the restoring device, and a digital twin device. A process for managing the restoration of the restoring device includes notifying the orchestrator of the downtime that may be occurring and may specify a downtime preparation time. The restoration orchestrator may begin forwarding service requests intended for the original device to the digital twin device. The digital twin device may service the requests using its own resources during the downtime preparation time. After completion of the restoration (or during the downtime preparation time), the digital twin device passes the data of the processed requests to the restoration orchestrator.

The restoration orchestrator, after the downtime preparation time is complete, stops forwarding the service requests to the digital twin device. The received data (from the digital twin device and associated with the service requests) is forwarded to the restored device to keep the server updated.

The following describes various embodiments of the invention.

FIG. 1 shows a diagram of a system (100) in accordance with one or more embodiments of the invention. The system (100) includes any number of clients (110), a network (120), a digital twin device (150), a restoration orchestrator (140), and a restoring device (130). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the restoring device (130), the clients (110), and the digital twin device (150) may be physical or logical devices, as discussed below. In one or more embodiments, the system (100) may include any number of restoring devices and any number of digital twin devices without departing from the scope of the invention. In one or more embodiments, the restoring devices may collectively be referred to as "a source environment". Similarly, in one or more embodiments, the digital twin devices may collectively be referred to as "a target environment".

While FIG. 1 shows a specific configuration of the system (100), other configurations may be used without departing from the scope of the invention. For example, although the clients (110) and the devices (the restoring device (130), the digital twin device (150)) are shown to be operatively connected through the network (120), the clients (110) and the devices (130, 150) may be directly connected, without an intervening network (e.g., 120). As yet another example, although the restoring device (130) and the restoration orchestrator (140) are shown to be directly connected, the restoring device (130) and the digital twin device (150) may be executing on the same environment (e.g., a production environment).

Further, the functioning of the clients (110) and the devices (130, 150) is not dependent upon the functioning and/or existence of the other device(s) in the system (100). Rather, the clients (110) and the devices (130, 150) may function independently, and perform operations locally that do not require communication with other devices. Accordingly, embodiments disclosed herein should not be limited to the configuration of devices and/or components shown in FIG. 1.

In one or more embodiments, the system (100) may deliver computing power and storage capacity as a service to users of the clients (110) via the network (120). The system (100) may also represent a comprehensive middleware layer running on computing devices (e.g., 400, FIG. 4) that supports virtualized application environments. In one or more embodiments, the system (100) may support a virtual machine (VM) environment, and may map capacity requirements (e.g., computational load, storage access, etc.) of VMs and supported applications to available resources (e.g., processing resources, storage resources, etc.) managed by the devices (e.g., 130, 150). Further, the system (100) may be configured for workload placement collaboration and computing resource (e.g., processing, storage/memory, virtualization, networking, etc.) exchange.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

In one or more embodiments, as being a physical computing device or a logical computing device (e.g., a VM), the restoring device (130) may be configured for hosting and maintaining various workloads, or for providing a computing environment (e.g., computing power and storage) whereon workloads may be implemented. The restoring device (130) may also exchange data with other devices (e.g., other restoring devices, digital twin devices, etc.) registered in/to the network (120) in order to, for example, participate in a collaborative workload placement. For example, the restoring device (130) may split up a request (e.g., an operation, a task, an activity, etc.) with another restoring device, coordinating its efforts to complete the request (e.g., to generate a response) more efficiently than if the restoring device (130) had been responsible for completing the request.

One of ordinary skill will appreciate that the restoring device (130) may perform other functionalities without departing from the scope of the invention. Examples of the restoring device (130) may include (but not limited to): an enterprise server, a modular server, a blade server, a mainframe, a workstation computer, etc. In one or more embodiments, the restoring device (130) may be a heterogeneous set, including different types of hardware components and/or different types of operating systems (OSs).

In one or more embodiments, a workload (not shown) may refer to a physical or logical component configured to perform certain work functions. Workloads may be instantiated (e.g., initiated, executed, etc.) and may be operated while consuming computing resources allocated thereto. Examples of a workload may include (but not limited to): a VM, a container, a database, an application, a collection of microservices, etc.

As used herein, a "server" may provide computer-implemented services (e.g., receiving a request, sending a response to the request, etc.) to the users. In one or more embodiments, the request may be, for example (but not limited to): a web browser search request, a REST request, a computing request, a database management request, etc. To provide the computer-implemented services to the users, the server may perform computations locally and/or remotely. By doing so, the server may utilize different computing devices (e.g., 400, FIG. 4) that have different quantities of computing resources (e.g., processing cycles, memory, storage, etc.) to provide a consistent user experience to the users.

As used herein, a "database" is an organized collection of structured data, typically stored in a computing system. In most cases, a database is controlled by a database management system, in which the data and the database management system (along with the applications that are associated with them) are referred to as a "database system". Data within the database system (simply "database") is typically modeled in rows and columns in a series of tables to make processing and querying efficient. Most databases use structured query language (SQL) for writing and querying data.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the amount of central processing unit (CPU), memory, and disk that those processes have access to.

Comparing to a VM, a container does not need to include a guest OS in every instance and may simply leverage the features and resources of a host OS. For example, instead of virtualizing the underlying hardware components, a container virtualizes the OS, so the container includes only the application (and its libraries and dependencies). The absence of the guest OS makes a container lightweight, fast, and portable.

In one or more embodiments, as being a stateful environment with stateful REST application programming interface (APIs) (where the APIs of the same application(s) are interdependent), the restoring device (130) may include any number of applications (and/or content accessible through the applications) that provide stateful, computer-implemented application services to a user. Applications may be designed and configured to perform one or more operations (e.g., functions, tasks, activities, etc.) instantiated by a user of the restoring device (130). Examples of an application may include (but not limited to): a word processor, a media player, a web browser, a file viewer, an image editor, etc.

In one or more embodiments, application services may include, for example (but not limited to): database services, electronic communication services, instant messaging services, file storage services, web-based services, desktop-based services, a workload placement collaboration, serving (e.g., processing) a request, sharing an application log, receiving computing resource details of a device, transmitting a request, analyzing data, streaming video, etc.

In order to provide the above-mentioned application services, each application may host similar or different components. The components may be, for example (but not limited to): instances of databases, instances of email servers, etc. Applications may be executed on one or more clients as instances of the applications.

In one or more embodiments, applications may vary in different embodiments, but in certain embodiments, applications may be custom developed or commercial (e.g., off-the-shelf) applications that a user desires to execute in the restoring device (130). In one or more embodiments, applications may be logical entities executed using computing resources of the restoring device (130). For example, applications may be implemented as computer instructions, e.g., computer code, stored in persistent storage that when executed by a processor(s) of a computing device (e.g., 400, FIG. 4) cause the computing device to provide the functionality of the applications described throughout this application.

In one or more embodiments, while performing, for example, one or more operations requested by a user, applications installed on the restoring device (130) may include functionality to request and use physical and logical components (discussed below) of the restoring device (130). The applications may perform other types of functionalities not listed above without departing from the scope of the invention. In one or more embodiments, while providing application services to a user, applications may store data that may be relevant to the user in storage/memory resources (discussed below) of the restoring device (130).

In one or more embodiments, in order to provide computer-implemented services, the restoring device (130) may include a collection of physical components (e.g., processing resources, storage/memory resources, networking resources, etc.) configured to perform operations of the restoring device (130) and/or otherwise execute a collection of logical components (e.g., applications, virtualization resources, etc.) of the restoring device (130).

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), etc.

As used herein, a "CPU" may refer to an electronic circuity that may execute operations specified by an application. A CPU may perform an operation based on the following three steps: (i) fetching instructions related to an operation from the storage/memory resources, (ii) analyzing the fetched instructions, and (iii) performing the operation based on the analysis. In one or more embodiments, an operation may be, for example (but not limited to): comparing numbers, performing a function, displaying a video, etc.

As used herein, a "GPU" may refer to an electronic circuitry that may provide parallel data processing capabilities to generate enhanced, real-time graphics and to perform accelerated computing tasks (which is particularly useful for machine learning (ML) operations). In one or more embodiments, a GPU may include, for example (but not limited to): a graphics memory controller, a video processing engine, a graphics and computation engine, etc.

As used herein, a "DPU" may refer to an electronic circuitry that may perform accelerated data processing and optimized data movement within each node. In one or more embodiments, the DPU may include, for example (but not limited to): a high-speed (e.g., 200 gigabits per second (200 Gbps)) networking interface, dynamic RAM (DRAM), a multi-core (e.g., 8-core) CPU, programmable acceleration engines (particularly for ML, security, and telecommunications purposes), etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

As used herein, "storage" may refer to a hardware component that is used to store data (e.g., application data) in each node. Storage may be a physical computer readable medium. In most cases, storage may be configured as a storage array (e.g., a network attached storage array), in which a storage array may refer to a collection of one or more physical storage devices. Each physical storage device may include non-transitory computer readable storage media, in which the data may be stored in whole or in part, and temporarily or permanently.

As used herein, "memory" may be any hardware component that is used to store data in each node. The data stored may be accessed almost instantly (e.g., in milliseconds (ms)) regardless of where the data is stored in memory. The memory may provide the above-mentioned instant data access because the memory may be directly connected to a CPU on a wide and fast bus (e.g., a high-speed internal connection that transfers data among hardware components of the node).

In one or more embodiments, application data may include, for example (but not limited to): a list of instructions, one or more application logs, etc. In one or more embodiments, application logs may include, for example (but not limited to): a setting of an application, a warning/an error (e.g., unknown software exception (0xc00d) occurred in the application at location 0x0007d) occurred in an application, a version of an application, a version of an OS, a display resolution configuration of a client, a type of an OS (e.g., a workstation OS), an identifier of an OS (e.g., Microsoft® Windows), a product identifier of an application, etc.

In one or more embodiments, a "setting of an application" may refer to a current setting that is being applied to an application either by a user or by default. A setting of an application may include, for example (but not limited to): a display option (e.g., a two-sided view) that is selected by a user, a font option that is selected by a user, an inbox folder setting of an electronic mail exchange application, a microphone setting of an application, a background setting of an application, etc.

In one or more embodiments, the restoring device (130) may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to (i) provide memory protection (e.g., allowing only certain applications to access memory) and (ii) provide cache control and bus arbitration.

In one or more embodiments, while applications provide computer-implemented services to the clients (110), the applications may store data that may be relevant to the clients (110) to the storage/memory resources. When the client-relevant data is stored, the client-relevant data may be subjected to loss, inaccessibility, or other undesirable characteristics based on the operation of the storage/memory resources.

To mitigate, limit, and/or prevent such undesirable characteristics, users of the clients (110) may enter into agreements (e.g., service level agreements) with providers (e.g., vendors) of the storage/memory resources. These agreements may limit the potential exposure of client-relevant data to undesirable characteristics. These agreements may, for example, require duplication of client-relevant data to other locations so that if the storage/memory resources fail, another copy (or other data structure usable to recover the data on the storage/memory resources) of the client-relevant data may be obtained. These agreements may specify other types of activities to be performed with respect to the storage/memory resources without departing from the invention.

In one or more embodiments, each application may include a virtual address space. A virtual address space may be a simulated range of addresses (e.g., identifiable locations) that mimics physical locations of one or more physical components of the restoring device (130). In most cases, an application is not configured to identify the physical locations of the components; rather, the application relies on other components of the restoring device (130) to translate one or more virtual addresses of the virtual address space to one or more physical addresses of the physical components. Accordingly, in one or more embodiments, an application may utilize a virtual address space to read, write, and/or otherwise manipulate data, without being configured to directly identify the physical address of that data within the physical components of the restoring device (130).

Further, each application may communicate with other components of the restoring device (130) to establish a mapping between a virtual address space and the physical components of the restoring device (130). In one or more embodiments, when a mapping is established, an application's use of the virtual address space enables the application to directly manipulate data in the physical components, without relying on other components of the restoring device (130) to repeatedly update mappings between the virtual address space and the physical addresses of the physical components of the restoring device (130).

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface the restoring device (130) with external entities (e.g., the digital twin device (150), the clients (110), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transmission control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the restoring device (130) and the external entities. For example, a networking resource may enable the restoring device (130) to be operatively connected, via Ethernet, using a TCP protocol to form a "network fabric", and may enable the communication of data between the restoring device (130) and the external entities. In one or more embodiments, the restoring device (130) may be given a unique identifier (e.g., an Internet Protocol (IP) address) to be used when utilizing the above-mentioned protocols.

Further, a networking resource, when using a certain protocol or a variant thereof, may support streamlined access to storage/memory media of other nodes. For example, when utilizing remote direct memory access (RDMA) to access data on another node, it may not be necessary to interact with the logical components of that node. Rather, when using RDMA, it may be possible for the networking resource to interact with the physical components of that node to retrieve and/or transmit data, thereby avoiding any higher-level processing by the logical components executing on that node.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

As an example, a VM may be executed using computing resources of the restoring device (130). The VM (and applications hosted by the VM) may generate data (e.g., VM data) that is stored in the storage/memory resources of the restoring device (130), in which the VM data may reflect a state of the VM. In one or more embodiments, the VM may provide services to clients (110), and may host instances of databases, email servers, or other applications that are accessible to the clients (110).

In one or more embodiments, a virtualization resource may include a hypervisor, in which the hypervisor may be configured to orchestrate an operation of a VM by allocating computing resources of the restoring device (130) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor.

Alternatively, in one or more embodiments, the hypervisor may be implemented as computer instructions, e.g., computer code, stored on storage/memory resources of the restoring device (130) that when executed by processing resources of the restoring device (130) cause the restoring device (130) to provide the functionality of the hypervisor.

In one or more embodiments, the restoring device (130) may undergo a restoration. In one or more embodiments, the restoration is a process for restoring the restoring device (130) to a previous configuration and/or to a user-defined checkpoint. During the restoration, the restoring device (130) may not be able to process any service requests issued by, e.g., the clients (110).

Though the restoring device (130) may not be servicing any service requests during the restoration, it may be beneficial to reduce the latency caused by waiting before the restoring device (130) services the requests. To address such latency, the restoring device (130) may utilize the digital twin device (150) for servicing the service requests obtained during the restoration. The digital twin device (150) may service the service requests during a downtime preparation time as discussed in, e.g., FIG. 2.

Figure 4:
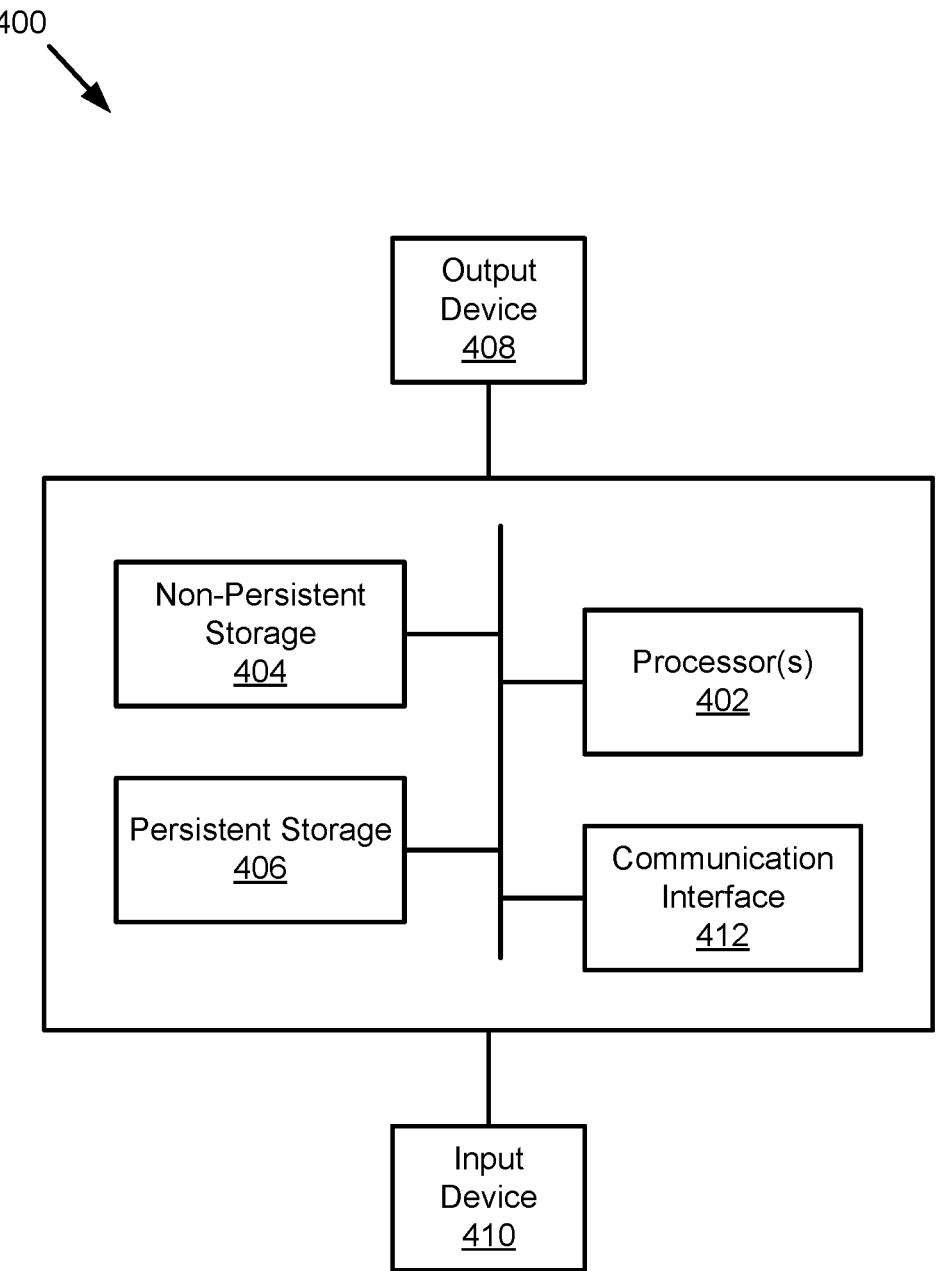
FIG. 4 shows a diagram of a computing device in accordance with one or more embodiments of the invention.

In one or more embodiments, the restoring device (130) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the restoring device (130) described throughout this application.

Alternatively, in one or more embodiments, the restoring device (130) may be implemented as a logical device. The logical device may utilize the computing resources of any number of computing devices to provide the functionality of the restoring device (130) described throughout this application.

In one or more embodiments, similar to the restoring device (130), the digital twin device (150) may also, for example (but not limited to): be configured for hosting and maintaining various workloads, be configured for providing a computing environment whereon workloads may be implemented, participate in a collaborative workload placement, be an enterprise server, be a modular server, include physical and logical components, include different types of OSs, include any number of applications, etc.

The digital twin device (150) may be frequently synchronized (e.g., by the state or by the checkpoint) of the restoring device (130). In this manner, the digital twin device (150) is capable, during the restoration of the restoring device (130), to perform the functionality of the restoring device (130).

In one or more embodiments, the digital twin device (150) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the digital twin device (150) described throughout this application.

Alternatively, in one or more embodiments, similar to the restoring device (130), the digital twin device (150) may also be implemented as a logical device.

In one or more embodiments, the restoration orchestrator (140) includes functionality for managing service requests obtained by the restoring device (130) during its restoration. The restoration orchestrator (130) may manage the service requests by orchestrating the forwarding of service requests from the restoring device (130) to the digital twin device (150) during the restoration. During the restoration, the restoration orchestrator (140) may collect the service requests intended to be sent to the restoring device (130) and forward the service requests to the digital twin device (150) to be processed by the digital twin device (150). The restoration orchestrator (140) may manage the service requests in accordance with, e.g., FIG. 2.

In one or more embodiments, the restoration orchestrator (140) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the restoration orchestrator (140) described throughout this application.

Alternatively, in one or more embodiments, similar to the restoring device (130) and the digital twin device (150), the restoration orchestrator (140) may also be implemented as a logical device.

Further, in one or more embodiments, the restoration orchestrator (140) may be an entity internal to the restoring device (130) or an external entity to the restoring device (130) without departing from the invention.

In one or more embodiments, the clients (110) may provide computer-implemented services to users of the clients (110) (and/or other computing devices such as, other clients or other types of devices). The clients (110) may provide any number and any type of computer-implemented services (e.g., data storage services, electronic communication services, etc.). The clients (110) may be physical or logical devices, as discussed below.

To provide computer-implemented services, entities hosted by the clients (110) may utilize data from any number of resources. For example, the clients (110) may utilize data stored in storage/memory resources of the restoring device (130). The clients (110) may also utilize data from other resources without departing from the invention.

In one or more embodiments, the clients (110) may issue service requests to the restoring device (130) to (i) receive responses and (ii) interact with various components of the restoring device (130) (described above). The clients (110) may also request data from and/or send data to the restoring device (130). Further, the clients (110) may initiate an application to execute on the restoring device (130) such that the application may (itself) gather, transmit, and/or otherwise manipulate data located on the restoring device (130), remote to the clients (110). In one or more embodiments, the clients (110) may share access to more than one node and may similarly share any data located on those devices. Any applications installed on the restoring device (130) may be synchronized to the digital twin device (150).

In one or more embodiments, the clients (110) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (110) described throughout this application.

Alternatively, in one or more embodiments, similar to the restoring device (130), the clients (110) may also be implemented as logical devices.

In one or more embodiments, the network (120) may represent a computing network configured for computing resource and/or messages exchange among registered computing hosts (i.e., the devices (130, 150), the clients (110), etc.). As discussed above, components of the system (100) may operatively connect to one another through the network (120) (e.g., a local area network (LAN), a wide area network (WAN), a mobile network, a wireless LAN (WLAN), etc.). In one or more embodiments, the network (120) may be implemented using any combination of wired and/or wireless connections. Further, the network (120) may enable interactions between the devices (130, 150) and the clients (110) through any combination of wired and/or wireless network protocols (e.g., TCP, UDP, Internet Protocol version 4 (IPv4), etc.).

The network (120) may encompass various interconnected, network-enabled subcomponents (not shown) (e.g., switches, routers, gateways, cables etc.) that may facilitate communications between the components of the system (100).

In one or more embodiments, the network-enabled subcomponents may be capable of: (i) performing one or more communication schemes (e.g., IP communications, Ethernet communications, etc.), (ii) being configured by one or more devices (e.g., 130, 150, etc.) in the network (120), and (iii) limiting communication(s) on a granular level (e.g., on a per-port level, on a per-sending device level, etc.).

In one or more embodiments, before communicating data over the network (120), the data may first be broken into smaller batches (e.g., data packets) so that larger size data can be communicated efficiently. For this reason, the network-enabled subcomponents may break data into data packets. The network-enabled subcomponents may then route each data packet in the network (120) to distribute the network traffic uniformly.

In one or more embodiments, the network-enabled subcomponents may decide how real-time (e.g., on the order of millisecond (ms) or less) network traffic and non-real-time network traffic should be managed in the network (120). In one or more embodiments, the real-time network traffic may be high priority (e.g., urgent, immediate, etc.) network traffic. For this reason, data packets of the real-time network traffic may need to be prioritized in the network (120). The real-time network traffic may include data packets related to, for example (but not limited to): videoconferencing, web browsing, voice over Internet Protocol (VoIP), etc.

In one or more embodiments, the non-real-time network traffic may be low priority (e.g., non-urgent) network traffic. For this reason, data packets of the non-real-time network traffic may not need to be prioritized in the network (120). The non-real-time network traffic may include data packets related to, for example (but not limited to): File Transfer Protocol (FTP) for web publishing, email applications, etc.

Figure 2:
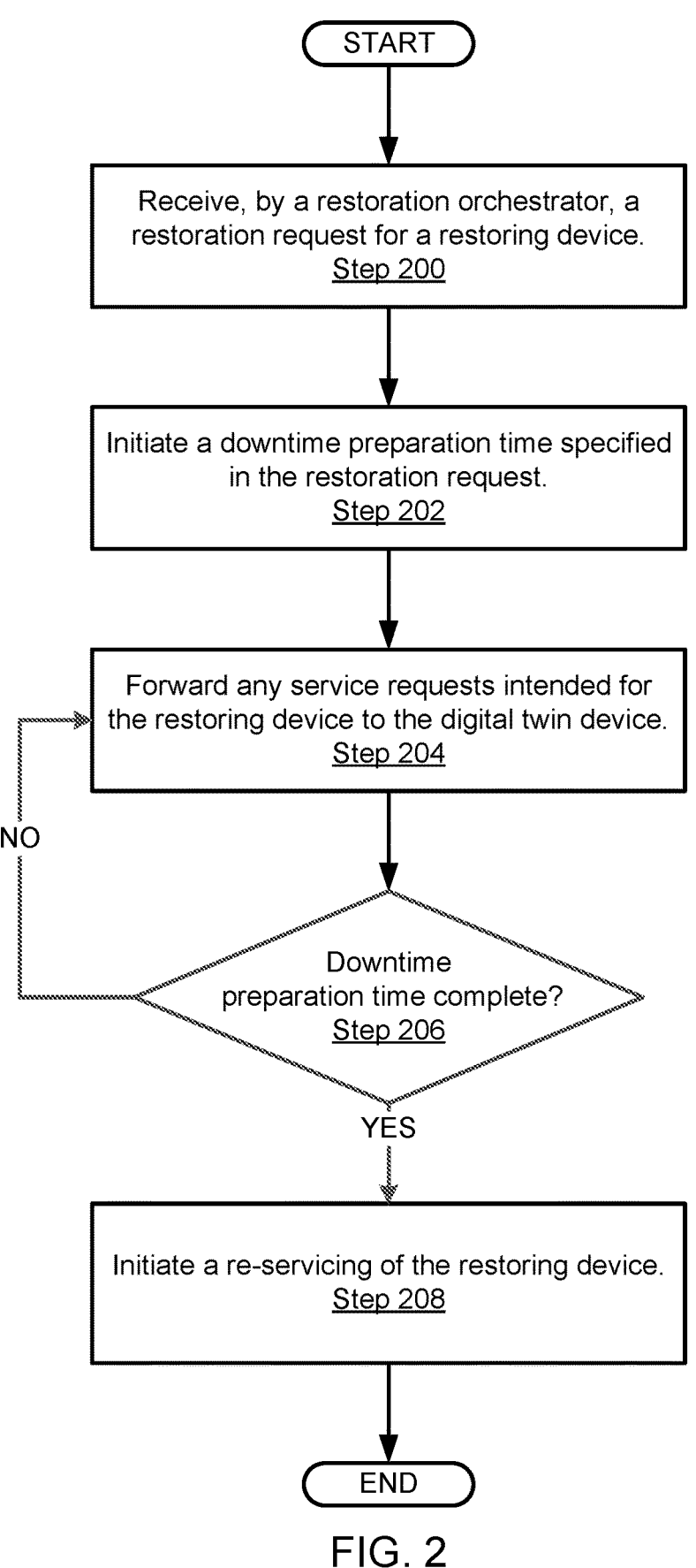
FIG. 2 shows a method for managing the restoration of a restoring device in accordance with one or more embodiments of the invention.

FIG. 2 shows a method for managing the restoration of a restoring device in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 2, the method shown in FIG. 2 may be executed by, for example, the above-discussed restoration orchestrator (140, FIG. 1). Other components of the system (100) illustrated in FIG. 1 may also execute all or part of the method shown in FIG. 2 without departing from the scope of the invention.

In Step 200, a restoration request is obtained for a restoring device. In one or more embodiments, the restoration request specifies restoring the restoring device to a previous state. The restoration request may specify that any service requests intended for the restoring device may not be serviced by the restoring device during the restoration.

In Step 202, a downtime preparation time is initiated. In one or more embodiments, in response to the restoration request, the restoration orchestrator determines the downtime preparation time. The downtime preparation time is determined based on a pre-defined function for calculating the downtime preparation time. For example, the downtime preparation time is calculated based on the amount of data to be restored (e.g., the amount of data to be restored may correlate to a value of time). Alternatively, the The downtime prediction time may be determined via other mechanisms without departing from the invention.

In Step 204, any service requests intended for the restoring device are forwarded to the digital twin service. In one or more embodiments of the invention, the service requests are forwarded by notifying the clients that the service requests are to be sent to the restoration orchestrator. The restoration orchestrator may, in turn, forward any obtained service requests, from the clients, to the digital twin device. The digital twin device may be instructed to process the service requests.

In alternative embodiments, the service requests are forwarded by intercepting the service requests sent to the restoring device and forwarding such requests to the digital twin device. In such embodiments, the client device is not notified of the restoration nor the forwarding.

In Step 206, a determination is made about whether the downtime preparation time is complete. In one or more embodiments, the determination is made based on a time elapsed exceeding the previously identified downtime preparation time. Alternatively, the determination is made based on a notification obtained from the restoring device that the restoration is completed. If the downtime preparation time is complete, the method proceeds to Step 208; otherwise, the method proceeds to Step 204.

In Step 208, after the determination that the downtime preparation time is complete, a re-servicing of the restoring device is initiated. In one or more embodiments, the re-servicing of the restoring device (which, after the restoration, is now a restored device) includes notifying the digital twin device of the completed restoration. The restoration orchestrator may further instruct the digital twin device to synchronize with the restored device based on the data, associated with the forwarded service requests, processed by the digital twin device. For example, the instructions may specify sending the processed data to the restored device. The synchronization may further include sending the state information of the restored device to the digital twin device. The re-servicing may further be initiated by notifying the client device(s) to send the service requests to the restored device (instead of, e.g., the restoration orchestrator).

The method may end after Step 208 is completed.

Start of Example

The following section describes an example of one or more embodiments. The example, illustrated in FIGS. 3.1-3.3, is not intended to limit the scope of the embodiments disclosed herein and is independent from any other examples discussed in this application. Actions performed in this example may be illustrated with circled numbers and described below using bracketed numbers (e.g., "[1]").

Turning now to FIG. 3.1, FIG. 3.1 shows a scenario in which a restoring device (310) is to undergo a restoration to a previous checkpoint. At a first point in time, prior to the restoration, the restoring device (310) processes service requests from the client device (300) [1]. At a later point in time, the restoring device (310) determines that a restoration is warranted [2]. Based on this determination, the restoring device (310) identifies a time it may take for the restoration to complete. In this example, the restoring device determines a time of 30 minutes. The restoring device (310) sends a restoration request to a restoration orchestrator (350) [3]. The restoration request specifies the restoring device (310) undergoing a restoration for the next 30 minutes.

The restoration orchestrator (350), in response to the restoration request, determines the downtime preparation time for the restoration. The downtime preparation time is determined to be 30 minutes. The downtime preparation time is initiated [4]. After the downtime preparation time is initiated, the restoration orchestrator notifies the client device (300) to forward the service requests to the restoration orchestrator (350) [5].

Turning now to FIG. 3.2, FIG. 3.2 shows the example system at a later point in time. The restoring device (310) undergoes the restoration [6]. During the restoration, the client device (300) sends a service request to the restoration orchestrator (350) [7]. The restoration orchestrator (350) forwards the service request to the digital twin device (330) [8]. In this example, the digital twin device (330) is at least substantially similar in functionality to the restoring device (310) prior to the restoration.

The digital twin device (330) services the service request to generate processed data [9]. The digital twin device (330) provides a response to the restoration orchestrator (350) that includes the processed data. The processed data is forwarded to the client device (300) [11].

Turning now to FIG. 3.3, at a later point in time, the restoring device (310) completes the restoration [12]. The restoring device (310) notifies the restoration orchestrator (350) of the completed restoration [13]. In response to the notification, the restoration orchestrator (350) notifies the digital twin device (330) of the completed restoration and instructs the digital twin device (330) to synchronize with the restoring device (310) [14].

In response to the instruction, the digital twin device (330) initiates the synchronization to transmit the required data and/or state information to the restoring device (310) and from the restoring device (310) to the digital twin device (330) [15]. The digital twin device (330) notifies the restoration orchestrator of the completed synchronization.

After the synchronization, the restoration orchestrator (350) sends a notification to the client device (300) of the completed restoration [16]. In response to the notification, the client device (300) resumes issuing service requests to the restoring device (310, to be processed by the restoring device (310) [17].

End of Example

Turning now to FIG. 4, FIG. 4 shows a diagram of a computing device in accordance with one or more embodiments of the invention.

In one or more embodiments of the invention, the computing device (400) may include one or more computer processors (412), non-persistent storage (404) (e.g., volatile memory, such as RAM, cache memory), persistent storage (406) (e.g., a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms without departing from the scope of the invention.

Embodiments disclosed herein may reduce the latency caused by waiting for a device to finish restoration before servicing any requests issued by a client that uses the services of the restoring device.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a restoration, the method comprising:

receiving, by a restoration orchestrator, a restoration request for the restoration by a restoring device, wherein the restoration request is issued by the restoring device based on a determination by the restoration device that the restoration is warranted, wherein the restoring device identifies a downtime preparation time based on the determination, and wherein the restoring device executes a virtual machine (VM);

in response to the restoration request:

collecting, during the downtime preparation time, service requests from the restoring device, wherein the service requests are initially issued to the VM by a client device;

forwarding the service requests to a digital twin device, wherein the service requests are serviced by the digital twin service during the downtime preparation time;

after the forwarding, making a determination that the downtime preparation time is complete; and based on the determination, initiating a re-servicing of the restoring device, wherein the restoration is complete after the determination.

2. The method of claim 1, further comprising:

before collecting the service requests, sending a forwarding request to a client device, wherein the forwarding request specifies sending the service requests to the restoration orchestrator.

3. The method of claim 1, wherein initiating the re-servicing comprises:

sending a synchronization request to the digital twin device, wherein the synchronization request specifies synchronizing the digital twin device with the restoring device.

4. The method of claim 1, wherein the digital twin service comprises functionality that is substantially similar to second functionality of the restoring device.

5. The method of claim 1, wherein the restoration orchestrator is external to the restoring device.

6. The method of claim 1, wherein the restoration orchestrator is internal to the restoring device.

7. The method of claim 1, wherein the downtime preparation time is specified in the restoration request.

8. A non-transitory computer readable medium comprising computer readable program code, which when executed by a computer processor enables the computer processor to perform a method for managing a restoration, the method comprising:

receiving, by a restoration orchestrator, a restoration request for the restoration by a restoring device, wherein the restoration request is issued by the restoring device based on a determination by the restoration device that the restoration is warranted, wherein the restoring device identifies a downtime preparation time based on the determination, and wherein the restoring device executes a virtual machine (VM);

in response to the restoration request:

collecting, during the downtime preparation time, service requests from the restoring device, wherein the service requests are initially issued to the VM by a client device;

forwarding the service requests to a digital twin device, wherein the service requests are serviced by the digital twin service during the downtime preparation time;

after the forwarding, making a determination that the downtime preparation time is complete; and based on the determination, initiating a re-servicing of the restoring device, wherein the restoration is complete after the determination.

9. The non-transitory computer readable medium of claim 8, further comprising:

before collecting the service requests, sending a forwarding request to a client device, wherein the forwarding request specifies sending the service requests to the restoration orchestrator.

10. The non-transitory computer readable medium of claim 8, wherein initiating the re-servicing comprises:

sending a synchronization request to the digital twin device, wherein the synchronization request specifies synchronizing the digital twin device with the restoring device.

11. The non-transitory computer readable medium of claim 8, wherein the digital twin service comprises functionality that is substantially similar to second functionality of the restoring device.

12. The non-transitory computer readable medium of claim 8, wherein the restoration orchestrator is external to the restoring device.

13. The non-transitory computer readable medium of claim 8, wherein the restoration orchestrator is internal to the restoring device.

14. The non-transitory computer readable medium of claim 8, wherein the downtime preparation time is specified in the restoration request.

15. A system for managing a restoration, the system comprising:

a processor comprising circuitry;

memory comprising instructions, which when executed perform a method, the method comprising:

receiving, by a restoration orchestrator, a restoration request for the restoration by a restoring device, wherein the restoration request is issued by the restoring device based on a determination by the restoration device that the restoration is warranted, wherein the restoring device identifies a downtime preparation time based on the determination, and wherein the restoring device executes a virtual machine (VM);

in response to the restoration request:

collecting, during the downtime preparation time, service requests from the restoring device, wherein the service requests are initially issued to the VM by a client device;

forwarding the service requests to a digital twin device, wherein the service requests are serviced by the digital twin service during the downtime preparation time;

after the forwarding, making a determination that the downtime preparation time is complete; and based on the determination, initiating a re-servicing of the restoring device, wherein the restoration is complete after the determination.

16. The system of claim 15, further comprising:

before collecting the service requests, sending a forwarding request to a client device, wherein the forwarding request specifies sending the service requests to the restoration orchestrator.

17. The system of claim 15, wherein initiating the re-servicing comprises:

sending a synchronization request to the digital twin device, wherein the synchronization request specifies synchronizing the digital twin device with the restoring device.

18. The system of claim 15, wherein the digital twin service comprises functionality that is substantially similar to second functionality of the restoring device.

19. The system of claim 15, wherein the restoration orchestrator is external to the restoring device.

20. The system of claim 15, wherein the restoration orchestrator is internal to the restoring device.

\* \* \* \* \*